United States Patent [19]

Dorman

[11] Patent Number: 5,209,644
[45] Date of Patent: May 11, 1993

[54] FLOW DIRECTING ELEMENT FOR THE TURBINE OF A ROTARY MACHINE AND METHOD OF OPERATION THEREFOR

[75] Inventor: Thomas E. Dorman, South Windsor, Conn.

[73] Assignee: United Technologies Corporation, Hartford, Conn.

[21] Appl. No.: 639,856

[22] Filed: Jan. 11, 1991

[51] Int. Cl.$^5$ ............................................. F01D 5/14
[52] U.S. Cl. .............................. 416/235; 416/241 R; 415/914
[58] Field of Search ............... 416/223 A, 223 R, 235, 416/236, 241 R; 415/914

[56] References Cited

U.S. PATENT DOCUMENTS

| | | | |
|---|---|---|---|
| 1,903,823 | 12/1928 | Lougheed | 416/223 R |
| 4,428,213 | 1/1984 | Neal et al. | 416/223 R |
| 4,846,629 | 7/1989 | Takigawa | 416/223 R |
| 4,859,150 | 8/1989 | Takigawa | 416/223 R |
| 4,869,644 | 9/1989 | Takigawa | 416/223 R |
| 4,900,230 | 2/1990 | Patel | 416/223 A |

FOREIGN PATENT DOCUMENTS

| | | |
|---|---|---|
| 681479 | 9/1939 | Fed. Rep. of Germany ...... 416/236 |
| 1113386 | 8/1961 | Fed. Rep. of Germany ...... 416/223 |
| 372378 | 5/1932 | United Kingdom . |
| 580806 | 9/1946 | United Kingdom . |
| 2032048 | 7/1979 | United Kingdom . |

OTHER PUBLICATIONS

Van Dyke "An Album of Fluid Motion" (p. 26).
Broadston "Surface-Texture Designation, Production, and Control" pp. 13-75-13-81.

*Primary Examiner*—Edward K. Look
*Assistant Examiner*—Michael S. Lee
*Attorney, Agent, or Firm*—Gene D. Fleischhauer

[57] ABSTRACT

A flow directing element (such as a rotor blade 34 or a stator vane 44) for the turbine section 16 of a rotary machine is disclosed. Various construction details are developed which increase the aerodynamic efficiency of the flow directing element. In one embodiment, the flow directing element is a rotor blade 34 having a roughened surface which approximates the critical roughness characteristic of the airfoil. In one particular embodiment, the roughness average of the surface lies between 120 to 200 AA microinches.

10 Claims, 5 Drawing Sheets

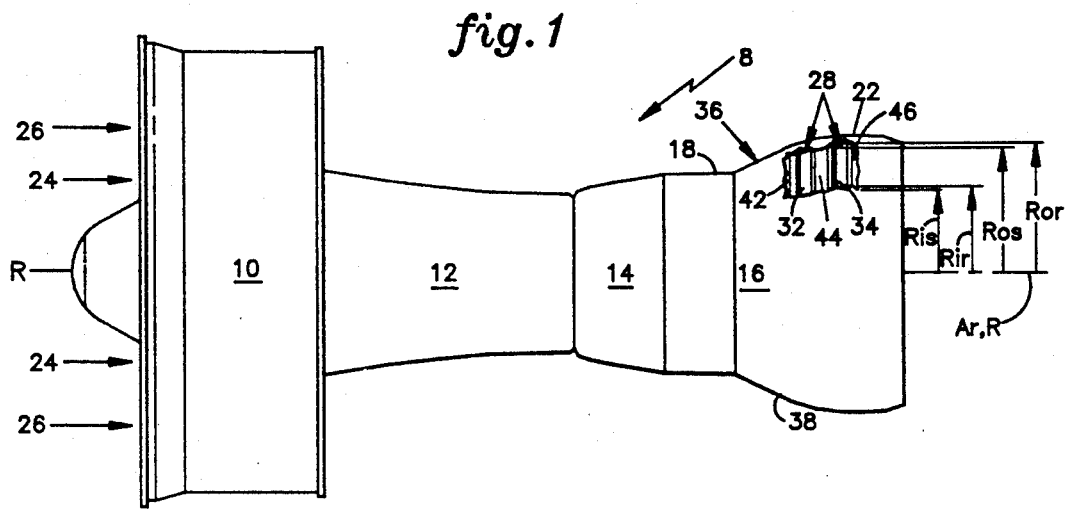
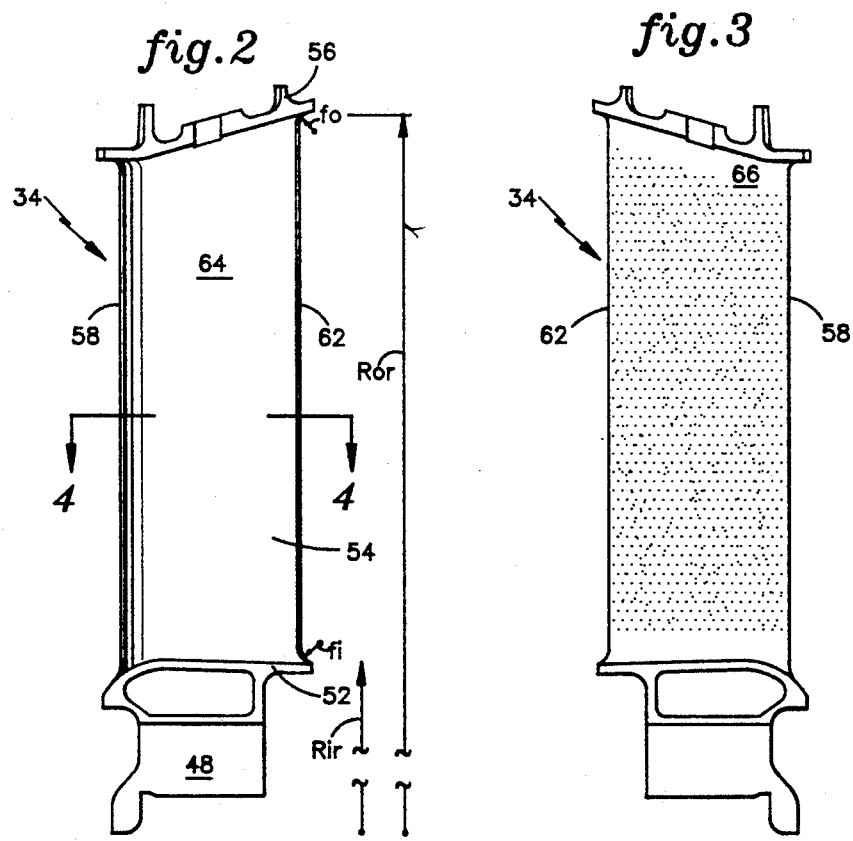

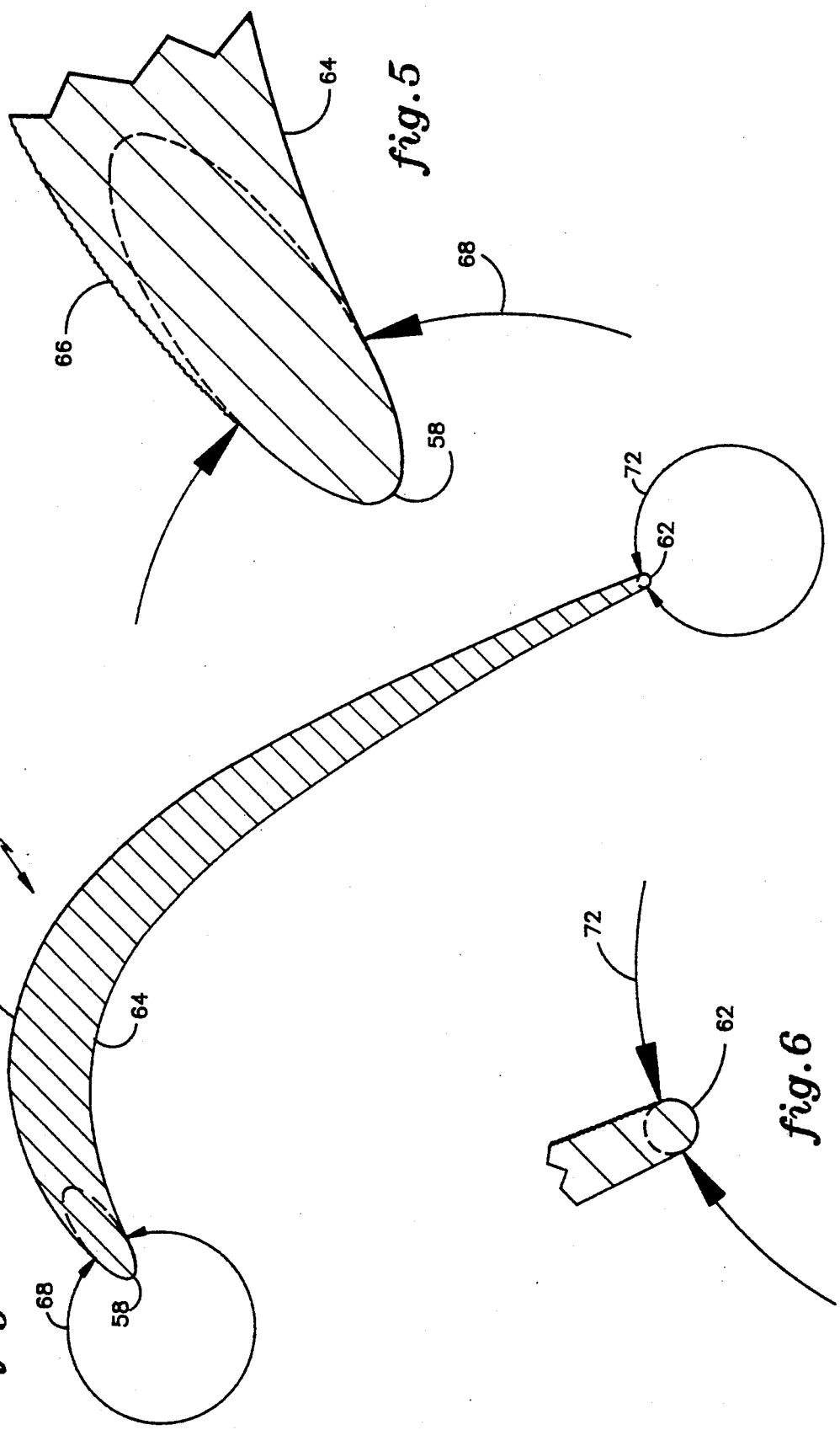

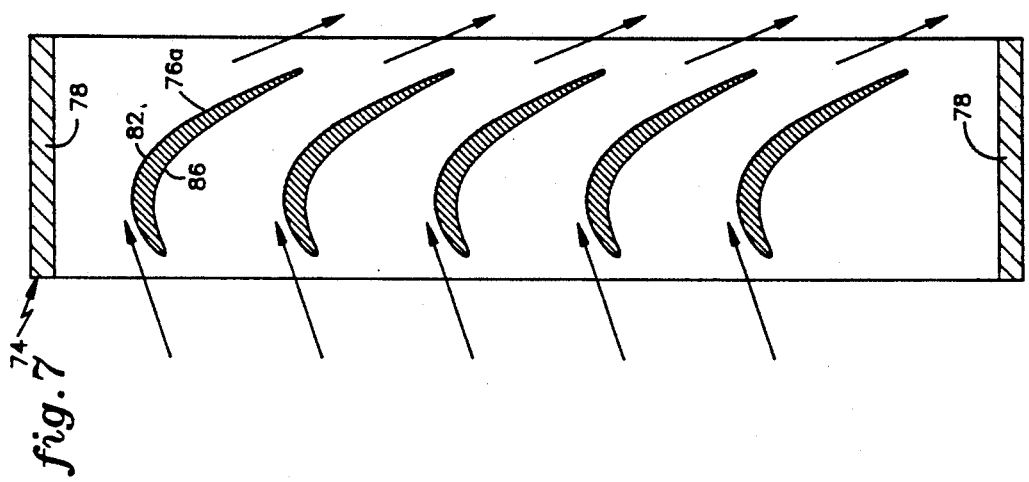
fig. 7
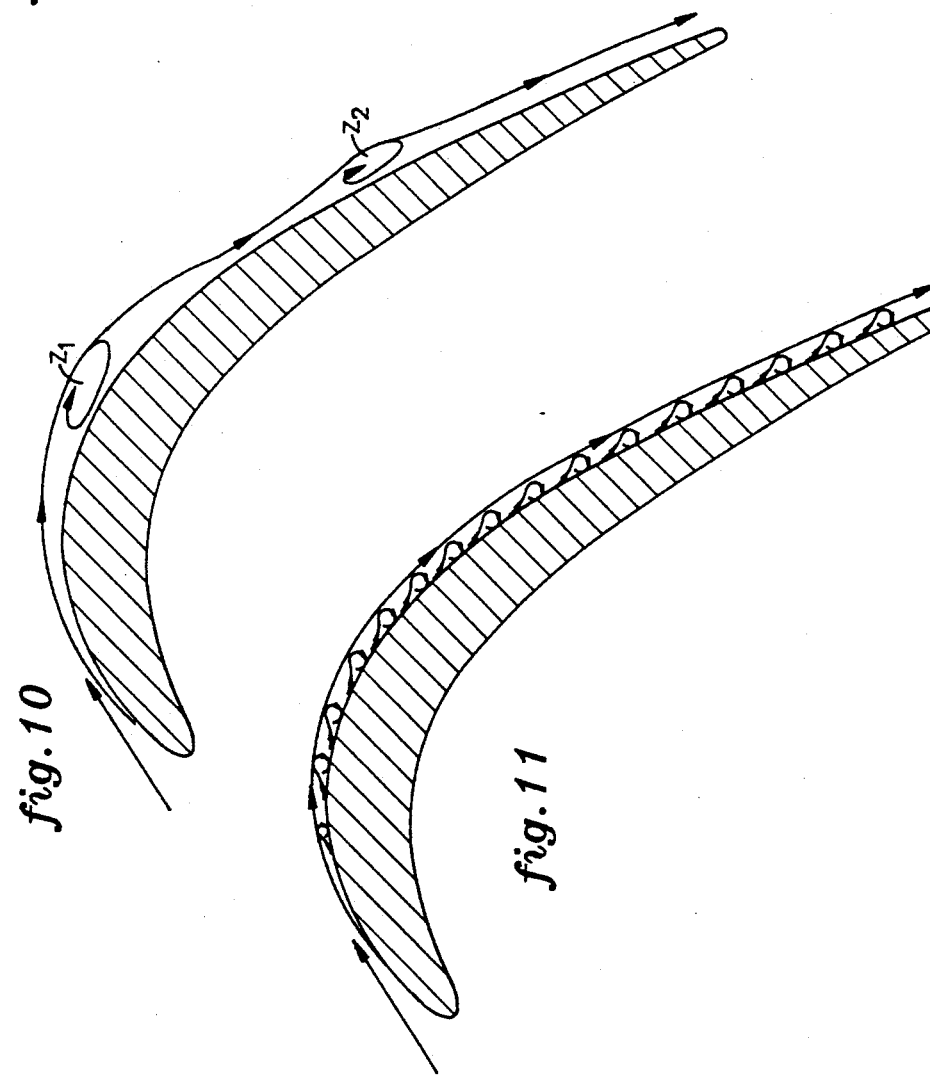
fig. 10
fig. 11

FLOW DIRECTING ELEMENT FOR THE TURBINE OF A ROTARY MACHINE AND METHOD OF OPERATION THEREFOR

TECHNICAL FIELD

This invention relates to rotary machines having turbine sections and particularly to airfoils for use in the turbine section of such engines.

BACKGROUND OF INVENTION

A gas turbine engine of the type adapted for use in an aircraft is one example of a rotary machine having a turbine section. The turbine section is disposed about an axis of symmetry R of the engine. The engine has a compression section and a combustion section upstream of the turbine section which are also disposed about the axis R. An annular flowpath for working medium gases extends axially through the compression section, the combustion section and the turbine section of the engine.

The working medium gases are compressed in the compression section and expanded in the turbine section. As the gases are flowed through the compression section, the gases encounter an increasing or adverse pressure gradient. In the turbine, the gases encounter a decreasing or favorable pressure gradient. These differences in pressure gradients cause the aerodynamic considerations of the turbine to vary greatly from the aerodynamic considerations of the compression section.

Fuel is mixed with the working medium gases in the combustion section and burned to add energy to the gases. The hot, pressurized gases are expanded through the turbine section to develop propulsive thrust and, through one or more of the turbines, to extract energy from the gases by driving the turbines about an axis of rotation $A_r$ of the engine.

The turbine section is adapted by a rotor assembly to extract work from the gases as the working medium gases are expanded through the turbine section. The rotor assembly typically includes one or more rotor disks and arrays of flow directing elements in the form of rotor blades which extend outwardly from the disk. The rotor blades have airfoils which extend across the working medium flowpath to guide the gases through the rotor assembly and to develop a driving force for the rotor assembly by flowing the gases over an airfoil shaped contour on the rotor blade.

To accomplish this purpose, the airfoil section of the rotor blade has a concave or pressure side surface which extends axially rearwardly from the leading edge of the rotor blade to the trailing edge. A convex or suction side surface extends rearwardly from the rotor blade and is joined to the concave surface at the trailing edge of the rotor blade. The difference in velocity of the gases as the gases pass through the array of rotor blades and over the airfoils causes a difference in static pressure across the airfoil (or lift) resulting in a force. The force acts on the airfoil, driving the rotor assembly about its axis of rotation.

Aerodynamic losses occur as the gases pass through the array of rotor blades and over the airfoils of the turbine. The loss in energy associated with these aerodynamic losses, decreases the efficiency of the turbine and thus decreases the efficiency of the engine. Accordingly, a great deal of effort has been devoted to decreasing these aerodynamic losses.

Because significant losses are associated on the suction side surface with separation of the flow from the airfoil, it has been suggested by many sources that the suction surface of the airfoil be roughened to avoid separation. One example of such a reference is G.B. Patent 580,806 issued to Griffith entitled "Improvements In Compressor, Turbine And Like Blades" which was filed in 1941. Griffith suggests that doing so has particular advantages when applied to the blades of compressors, but is of value in some conditions of operation in a turbine. However, roughening the surface introduces stress concentrations. this is of concern in the turbine because of the stresses which the blade encounters in high temperature environment of the turbine.

Another approach is to apply a local trip device to the blade of the turbine as suggested in U.S. Pat. No. 4,822,249 issued to Eckardt entitled "Axial Flow Blade Wheel Of A Gas Or Steam Driven Turbine". In Eckardt, the local projection might be a spoiler edge of sawtooth profile which disrupts the velocity profile and thus the pressure distribution of the airfoil to affect separation and avoid the formation of laminar separation bubbles. Still other approaches to avoid separation are to energize the boundary layer by the injection of fluid or to prevent separation by creating a suction on the interior of the airfoil such that the boundary layer is pulled inwardly to the interior of the blade.

Still another approach to improving aerodynamic performance has been to polish the surfaces of the airfoil, thereby removing the roughness of the airfoil which results from polishing the airfoil. This was the approach used most recently for modern gas turbine engines manufactured by The Pratt & Whitney Group of Applicant's Assignee. One advantage of removing roughness from the blades is that surface roughness introduces stress concentrations into the blade.

In such applications, the finished blade had a surface roughness after fabrication by casting of 60 AA–80 AA microinches. The blade was finished by polishing operations to reduce the roughness of the surface to 30 AA microinches (commonly referred to as the surface roughness of "30 AA").

In this regard, it is important to designate the type of measurement used to evaluate surface roughness because many standards exit and because of the difficulty in measuring surface irregularities, which are very complex in shape and character. The "AA" designation of surface-texture quality is a commonly accepted standard, as pointed out in Mark's Handbook Of Mechanical Engineering (9th edition—1987). This standard is set forth in the ANSI B46.1 standard. Marks notes the ANSI B46.1 standard "conforms in all essential elements with the British, Canadian and most ISO international standards, even though different terms are used [to designate them]; i.e., the $R_a$, the AA (arithmetic average), and the CLA (centerline average) are identical with the internationally adopted symbol of $R_a$ of ISO R468". In this standard, the height rating is expressed as an average deviation from the mean surface. The mean surface is a surface located in such a way that the volume of the peaks above the mean surface is equal to the volume of the valleys below the mean surface. The mean surface is the perfect surface that would result if all the peaks were leveled off and the material used to fill the valleys. The arithmetic average deviation of the surface of the irregularities from the mean surface is defined as the result of taking a great many uniformly spaced measurements in microinches and averaging them.

The above art not withstanding, scientists and engineers working under the direction of Applicant's Assignee have sought to decrease flow losses through turbine cascades in a way which might change the surface of the airfoil, while still having an airfoil with acceptable stress concentrations at critical locations in the airfoil for acceptable fatigue life of the airfoil.

SUMMARY OF INVENTION

This invention is in part predicated on the recognition that increasing the roughness of a turbine airfoil surface adversely affects the fatigue life of the airfoil but provides a significant aerodynamic benefit which disappears or nearly disappears as surface roughness increases beyond a critical roughness characteristic. Increasing the roughness of the airfoil beyond the critical roughness characteristic results in a smaller marginal benefit in pressure loss, no benefit at all or in an increased pressure loss. Accordingly, operating at or near the critical roughness characteristic of the airfoil enhances the aerodynamic performance of the airfoil while minimizing the adverse effect that roughening has on the cyclic fatigue life of the airfoil.

According to the present invention, a flow directing element for the turbine of a rotary machine has an airfoil having a critical roughness characteristic above 60 AA and a convex surface having a surface roughness which is within twenty percent of the critical roughness characteristic to reduce separation of the boundary layer and formation of recirculation zones in the boundary layer.

In accordance with one embodiment of the present invention, a flowpath for working medium gases passes between adjacent airfoils at Reynolds numbers between 80,000 and 200,000 and the suction side surface has a surface roughness which lies in a range of 120 AA microinches to 200 AA microinches.

According to the present invention, a method of forming the airfoil includes the steps of forming an airfoil having a convex and a concave surface, and, roughening the convex surface so that the roughness of the surface is within 20 percent of the critical roughness characteristic of the surface.

In accordance with one detailed method of forming the airfoil, the airfoil is roughened by impacting the surface with a fine grit causing minute indentations in the airfoil surface.

According to the present invention, an aircraft having a sea level, take off operative condition and a cruise operative condition includes a gas turbine engine having a turbine which employs airfoils with suction surfaces which have a surface roughness within twenty percent of the critical roughness characteristic of the airfoil surface at the cruise operative condition.

A primary feature of the present invention is a flow directing element for a turbine, such as rotor blade or stator vane, which has an airfoil. The airfoil has a critical roughness characteristic under operative conditions. The airfoil has a pressure surface and a suction surface. The roughness of the suction surface is within twenty percent of the critical roughness characteristic. Another feature is the leading edge region and trailing edge region of the airfoil. The roughened surface is spaced chordwisely from the leading edge and from the trailing edge. In one embodiment, a feature is an end wall adjacent the flowpath for working medium gases. The roughened surface is spaced spanwisely from the end wall. In one embodiment the spacing of the roughened surface from the end wall is equal to one-sixth (1/6th) of the ratio of the outer diameter to the inner diameter of the airfoil about the axis of the engine. In a rotor blade, the ratio is commonly referred to as the tip to hub ratio. In one particular embodiment, the airfoil surface has a roughness which is 120 to 200 AA microinches. The leading edge lies on an ellipse. A leading edge region extends between tangent lines to the ellipse on the suction surface and the pressure surface. The leading edge region is not roughened beyond the as cast condition. The trailing edge lies on a cylinder. A trailing edge region extends between tangent lines to the circle on the suction surface and the pressure surface. The trailing edge region is not roughened beyond the as cast condition.

A primary advantage of the present invention is the engine efficiency and fatigue life of airfoils which results from roughening the suction surface to reduce aerodynamic losses but limiting the roughness using the critical roughness characteristic of the airfoil. Another advantage is the structural fatigue life of the flow directing element which results from spacing the roughened surface away from the leading edge, the trailing edge and from the end walls to avoid stress concentrations associated with the roughened surface in these high stress regions in the airfoil. Another advantage is the increase in engine efficiency for an aircraft having a flight cycle which results from establishing the critical roughness characteristic primarily for the cruise operative condition to improve aerodynamic performance at the operative condition which is the longest part of the flight cycle.

The foregoing features and advantages of the present invention will become more apparent in light of the following detailed description of the best mode for carrying out the invention and the accompanying drawings.

BRIEF DESCRIPTION OF DRAWINGS

FIG. 1 is a simplified side elevation view of a turbofan, gas turbine engine with the outer case of the turbine broken away to show portions of a rotor assembly and stator assembly in the turbine section of the engine.

FIG. 2 is a side elevation view of the concave side of one of the rotor blades shown in FIG. 1.

FIG. 3 is a side elevation view of the convex side of the rotor blade shown in FIG. 2.

FIG. 4 is a cross-sectional view of an airfoil section taken along the lines 4—4 of FIG. 2 showing the concave (pressure) surface and the convex (suction) surface.

FIG. 5 is an enlarged view of the leading edge region of the airfoil section shown in FIG. 4.

FIG. 6 is an enlarged view of the trailing edge region of the airfoil section shown in FIG. 4.

FIG. 7 is a schematic representation of a cascade test apparatus used in determining the critical roughness characteristic for an array of airfoils of a turbine.

FIG. 10 is a schematic representation of an unroughened airfoil and the boundary layer for the airfoil which has separated, reattached and separated.

FIG. 11 is a schematic representation of an airfoil having a roughened surface, with a turbulent boundary layer which prevents separation of the boundary layer from the airfoil.

BEST MODE FOR CARRYING OUT THE INVENTION

Figure 8:
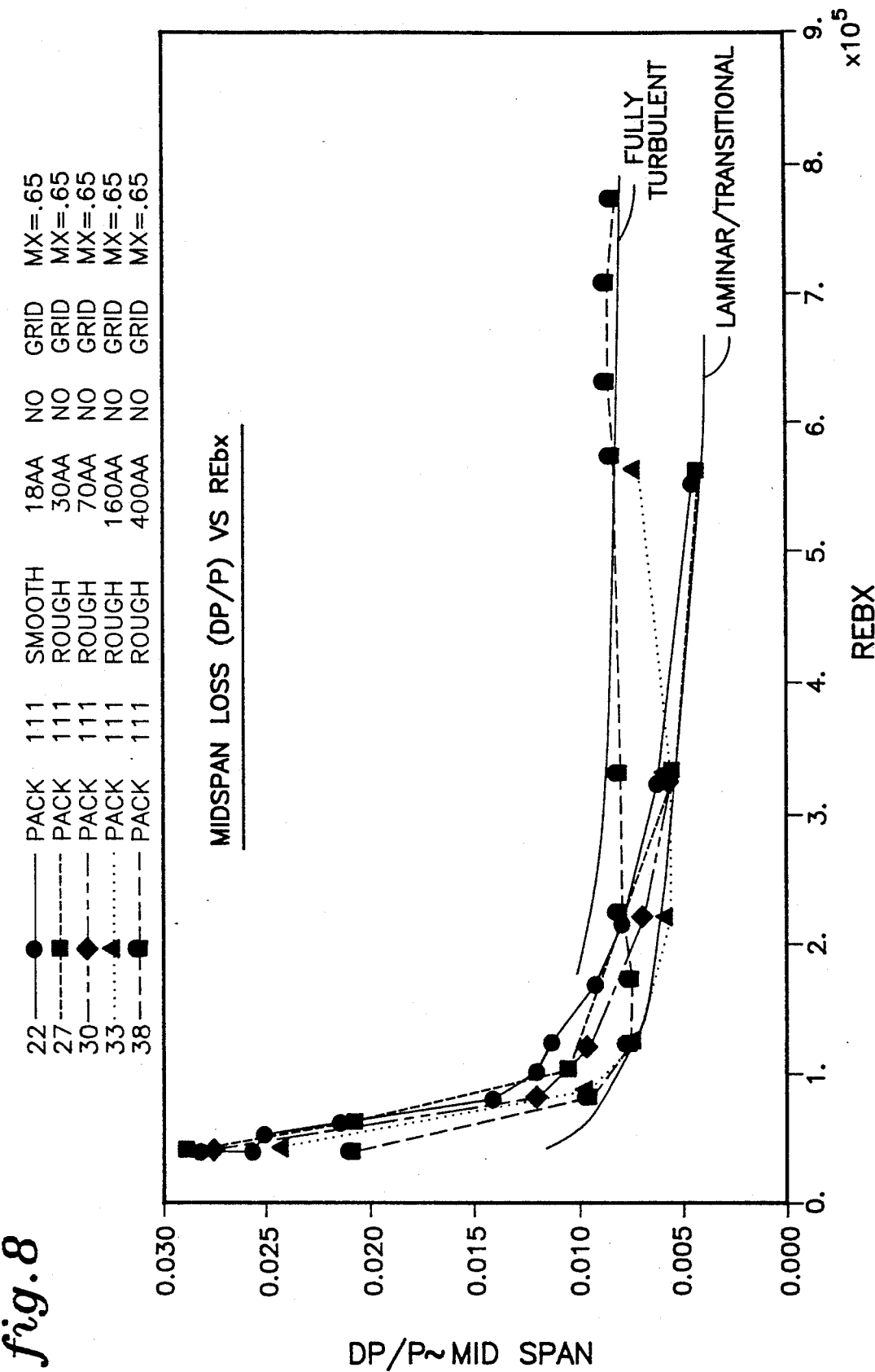
FIG. 8 is a graphical representation of normalized mid-span pressure loss for a constant section airfoil of the turbine shown in FIG. 1 as a function of Reynolds number for different surface roughnesses of the airfoil.

FIG. 1 shows a turbofan, gas turbine engine embodiment 8 of the present invention. The engine has an axis of rotation $A_r$ and an axis of symmetry R. The principal sections of the engine are a fan section 10, compression section 12, a combustion section 14 and a turbine section 16. The turbine section includes a high pressure turbine 18 and a low pressure turbine 22. An annular flowpath 24 for primary working medium gases extends axially through the sections of the engine. A secondary flowpath 26 extends through the fan section of the engine outwardly of the primary flowpath.

The turbine section 16 includes a rotor assembly 28. The rotor assembly has a rotor disk (not shown) and arrays of rotor blades, as represented by the rotor blade 32 and the rotor blade 34, which extend radially outwardly across the working medium flowpath. The rotor blade is one example of a flow directing element. The rotor assembly has a radius $R_{ir}$ which extends to the inner diameter of the rotor blade and a radius $R_{or}$ which extends to the outer diameter of the rotor blade.

A stator assembly 36 in the turbine section 22 circumscribes the rotor assembly. The stator assembly includes an outer case 38. The outer case extends circumferentially about the axes of the engine and outwardly of the rotor assembly to outwardly bound the working medium flowpath 24. Arrays of stator vanes extend radially inwardly from the outer case and is disposed between adjacent arrays of rotor blades as represented by the stator vane 42, the stator vane 44 and the stator vane 46. The stator vanes are a second example of a flow directing element. The stator vane 44 has a radius $R_{is}$ to the inner diameter of the stator vane and a radius $R_{os}$ to the outer diameter of the stator vane.

The annular flowpath 24 extends axially through the low turbine section passing in succession through arrays of rotor vanes and arrays of stator vanes.

FIG. 2 is a side elevation view of the rotor blade 34 shown in FIG. 1. The rotor blade has a root 48 which adapts the rotor blade to engage the rotor disk. An inner end wall 52 or blade platform is attached to the root. An airfoil 54 extends radially outward from the platform. An outer end wall 56 or tip shroud is attached to the airfoil. The rotor blade has a fillet having a fillet radius $f_o$ between the outer end wall and the airfoil and a fillet having a fillet radius $f_i$ between the inner end wall and the airfoil. The fillets provide a transition between the end walls and the airfoil to reduce bending stresses resulting from the attachment loads of the tip shroud to the airfoil and the airfoil to the root and platform.

The airfoil has a leading edge 58 and a trailing edge 62. A concave (pressure side) surface 64 extends chordwisely from the leading edge to the trailing edge. A convex (suction side) surface 66 extends chordwisely from the leading edge to the trailing edge. These surfaces are the primary flow directing surfaces of the airfoil.

FIG. 3 is a side elevation view of the turbine blade 34 shown in FIG. 2 showing the convex or suction side surface 66 of the airfoil. The suction side surface has a roughened surface as shown by the dotted region on the surface. The surface has a predetermined roughness average $R_a$ or AA as described below. The roughened surface is spaced chordwisely from the leading edge and from the trailing edge. The roughened surface is spaced spanwisely from the fillet in each of the end wall regions by a distance which is greater than the fillet radius. Typically, the distance will approximate one-sixth of the ratio $R_{or}/R_{ir}$ (tip to hub ratio) of the airfoil, but may be larger in some applications. For stator vanes, the spacing will approximate one-sixth of the ratio $R_{os}/R_{is}$ of the airfoil.

FIG. 4 is an enlarged cross-sectional view of a typical airfoil section 34s taken along the lines 4—4 of FIG. 2. The leading edge region is elliptically shaped as shown by the broken line which forms an imaginary ellipse. As shown in FIG. 4 and FIG. 5, the suction side surface and pressure side surface are tangent to the ellipse at the beginning of the leading edge region on either side of the airfoil. In the embodiment shown, the leading edge region surface is not roughened and the roughened suction side surface extends to this region. In other applications, the roughened surface may be spaced further from the leading edge region for aerodynamic or structural reasons.

The trailing edge region 72 is formed in a like manner as shown in FIGS. 4 and 6. The trailing edge region has a cylindrical shape as shown by the broken lines which forms an imaginary circle. The suction side surface 66 and pressure side surface 64 are tangent to the trailing edge region. The trailing edge region extends between the points of tangency of the two surfaces. The trailing edge region is not roughened and the roughened suction side surface extends to this 1 region. In other applications, the roughened surface may be spaced from the trailing edge region for aerodynamic or structural reasons.

FIG. 7 is a schematic representation of a cascade test apparatus 74 for determining the critical roughness characteristic of an airfoil. The cascade consists of a plurality of airfoils laterally spaced one from the other and oriented toward the approaching flow. The cascade is bounded by walls 78.

Each airfoil 76 of the cascade is identical to the other airfoils. The airfoils are constant section airfoils, having an airfoil section 76s which is a typical airfoil section of the actual airfoil used in the turbine. Such an airfoil section has the same pressure distribution on the pressure side surface 86 and suction side surface 88 (that is pressure distribution, velocity distribution and Mach number distribution) as the actual airfoil section 34s used in the turbine.

Gases, such as air, are flowed through the cascade to model the flow of working medium gases through the turbine 22. The gases are flowed through the cascade at different velocities causing the Reynolds number and pressure loss to vary in the cascade. The pressure loss is attributable to boundary layer effects and other flow losses which occur as the gases pass through the cascade. The pressure loss across the cascade is the difference between the total pressure entering the array of airfoils and the total pressure leaving the array of airfoils. The pressure loss is measured as a function of Reynolds number at the mid-span region (that is, between the inner diameter and the outer diameter of the airfoil) and is normalized by a convenient pressure parameter, such as the inlet total pressure to the cascade.

A series of tests were performed using such a cascade to determined the effect of surface roughness on pressure loss. The results of these tests are summarized in FIG. 8.

The airfoils had roughened pressure side and suction side surfaces. Roughnesses of 18 AA, 30 AA, 70 AA, 160 AA and 400 AA were used. The surface of each airfoil was roughened by impacting the surface with an aluminum oxide grit under air pressure. The air pressure used to drive the grit was approximately 30 pounds per square-inch. The grit size was varied to produce arrays of airfoils having different surface roughnesses. For example, a number 24 aluminum oxide grit is used to produce a surface roughness of approximately 150 AA microinches to 180 AA microinches. Coarser grits will produce rougher surfaces, finer grits will produce less rough surfaces.

As the particles of grit were impacted against the airfoil surface, the particles of grit caused an indentation in the airfoil. The indentation will mirror to some extent the surface of the grit particle which is sharp-edged. As a result of the indentation, stress concentrations are introduced into the airfoil surface. After the grit strikes the surface, the grit may be replaced with new grit or it may be recycled. If the grit is recycled, additional time may be required to produce the same level of roughness in the surface. Other techniques for roughening the surface might prove satisfactory, such as casting the airfoil in a coarser than normal medium or placing inclusions, which partially penetrate the surface, in the surface of the airfoil which are later removed.

The measurement technique used to measure the Surfanalyzer Model 4000 instrument was used to measure the roughness average ($R_a$, AA or CLA) of the surface. Measurements were taken typically in the vicinity of the twenty percent span, fifty percent span and eighty percent span regions of the airfoil for the fifty percent actual chord and ninety percent actual chord locations. More or less measurements may be taken to insure that the surface has a relatively uniform roughness. The Surfanalyzer Model 4000 instrument was set for a thirty thousandth of an inch cutoff (0.030 inches) and a one thousandth of an inch per second drive speed (0.001 inch/sec) and measured over a one quarter inch stroke (0.25 inches) with a 0.4 mil stylus head. If the measurement location coincided with a cooling hole, marking/stamp, or abrupt change in curvature, the measurement was be taken as close as possible to the desired zone. In statistically analyzing the data, the average roughness and three sigma variation were used based on the individual measurements.

FIG. 8 is a graphical representation of flow loss (DP) at the mid-span location of the airfoil as a function of the Reynolds number for different airfoil roughnesses. The flow loss is normalized by dividing the flow loss by the total pressure of the flow at the inlet to the cascade. As shown, the flow loss at low Reynolds numbers tends to decrease for a given Reynolds number as surface roughness increases. However, as Reynolds numbers increase, increased surface roughness does not have the same benefit and, as shown by the 160 AA roughness curve, seems to increase the pressure loss. Thus, as surface roughness increases, pressure losses increase (with an adverse effect on performance) and stress concentrations increase (with an adverse effect on cyclic fatigue life of the flow directing element).

This is a particularly important realization as applied to large gas turbine engines (20,000–70,000 lbf thrust) used to propel aircraft that spend a large portion of the flight cycle at a steady state condition referred to as the cruise operative condition. The variation in Reynolds number for these large gas turbine engines at the cruise condition is relatively small. And, the effect of changes in Reynolds number or pressure loss in the cruise operative condition from model to model as a function of surface roughness shows there is a preferred range of surface roughnesses for the low pressure turbine airfoils of these engines.

Figure 9:
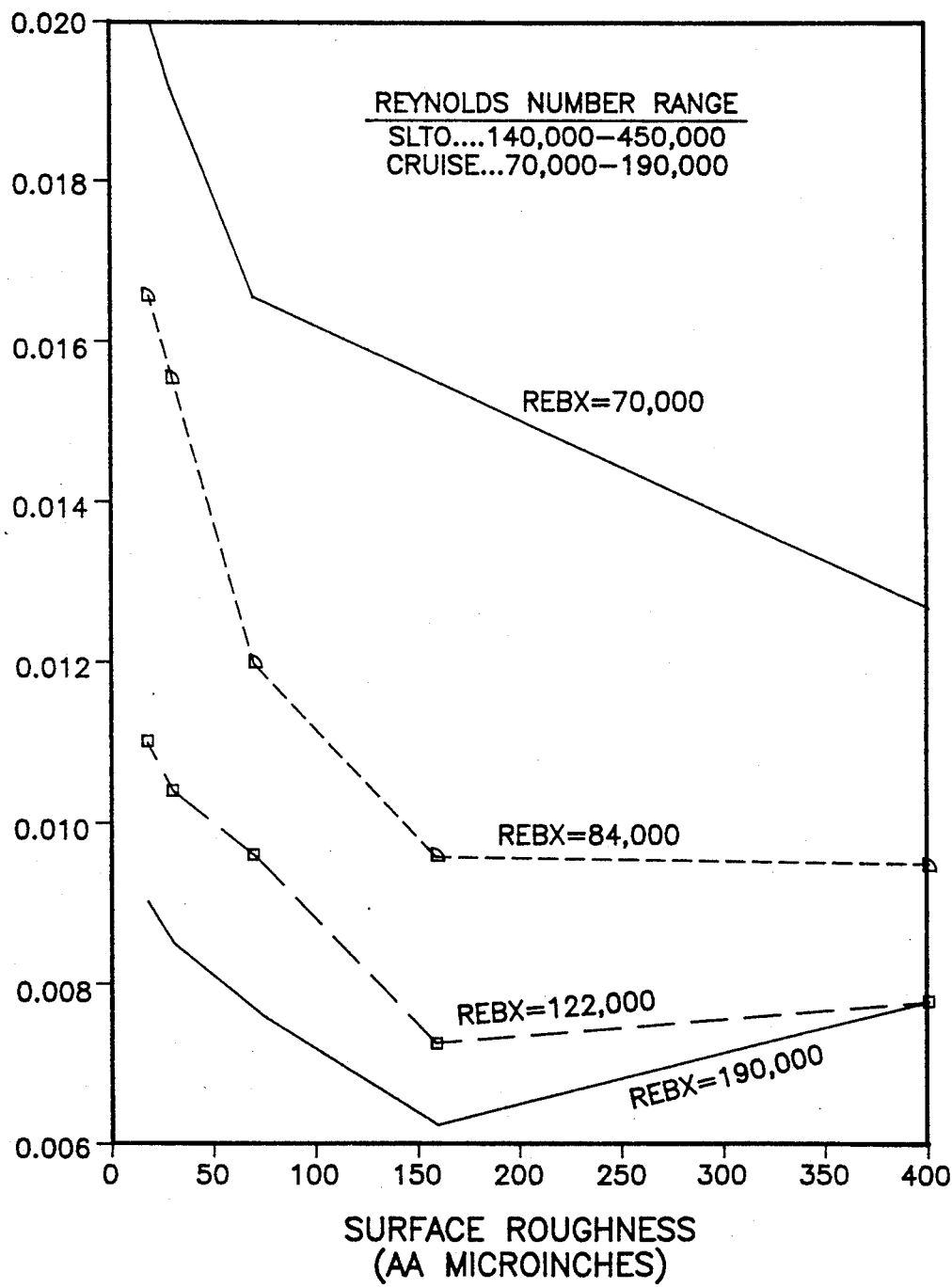
FIG. 9 is a graphical representation of normalized pressure loss as a function of surface roughness average ($R_a$, AA, CLA) for different values of Reynolds number.

FIG. 9 is a graphical representation of the data shown in FIG. 8 showing the effect of surface roughness on pressure loss at given Reynolds number such as a Reynolds number associated with the cruise operative condition (Reynolds number characteristic). A straight line fit is used to connect the actual data points for Reynolds numbers of 84,000 and 120,000 because the gap between data points is large. The Reynolds number curves of 70,000 and 190,000 graphically represent the data as correlated from FIG. 7.

As shown in FIG. 9, the Reynolds number range of interest for the cruise operative condition of an aircraft engine of the large turbofan type is from approximately 70,000 to approximately 20,000. The Reynolds numbers for the sea level take off operative condition range from 140,000 to 450,000. However, the engine spends a relatively short period of time at take off or full power conditions. Accordingly, for the greatest benefit to energy consumption and engine efficiency, the effect of surface roughness on pressure loss at the cruise operative condition is most important.

Low pressure turbine airfoils are made by casting using the lost wax process. These airfoils have a surface finish of approximately 60 to 80 AA. At the cruise operative condition, the pressure loss through the airfoils decreases sharply as surface roughness is increased from the typical cast condition to a minimum which occurs in a range of about 120 to 200 AA. At about 160–165 AA, the data suggests that additional roughness at best does not have a significant impact on pressure loss (Reynolds number of approximately 80,000) and may be counterproductive at higher Reynolds numbers as suggested by the Reynolds number curve for 122,000 and 190,000. The region of roughness at which a significantly diminished benefit or detriment occurs for increases in surface roughness is the critical roughness characteristic for the airfoil.

As can be seen, the critical roughness characteristic for Reynolds numbers of approximately 80,000 to 200,000, where the marginal decrease in pressure loss for a marginal increase in surface roughness appears clearly diminished, occurs at approximately 120 AA to 200 AA surface roughness and appears to be localized at about 150 AA to 180 AA surface roughness. The critical roughness characteristic $R_c$ for a given Reynolds number is the roughness at which an incremental twenty percent increase in roughness causes an average decrease in pressure loss which is less than one-half of the average decrease in pressure loss which resulted from the same incremental change in surface roughness needed to reach that roughness (that is, DP/P average for the interval ($R-0.2R_c$) to ($R_c$) divided by DP/O average for the ($R_c$) to ($R+0.2R_c$) is greater than or equal to 2.0). Thus, the critical roughness characteristic $R_c$ of the airfoil provides a measure of the relative benefit in pressure loss beyond which very little benefit in decreasing pressure loss is realized while the surface roughness causes an increase in stress concentrations.

The phenomena which causes this sudden slowing in the decrease of pressure loss is not well understood, and was unexpected when found. One explanation is consistent with physical phenomena and is in part supported by analytical and empirical results shown in FIGS. 8 and 9. This phenomena is in part illustrated by FIG. 10 and FIG. 11.

At low surface roughnesses as shown in FIG. 8, the pressure loss is relatively high and is associated with the laminar boundary layer which forms at the beginning of the airfoil. In smooth surfaces, as shown in FIG. 10, the boundary layer separates causing formation of a recirculation zone of gases $Z_1$ which forces the boundary layer even further away from the airfoil. This so-called separation bubble causes a severe penalty in aerodynamic performance as shown in FIG. 9 by the significant pressure loss which occurs for airfoils having a low surface roughness (18 AA, 30 AA). The flow may even reattach downstream of the first bubble, separate, and form a second separation zone or bubble $Z_2$.

As surface roughness increases, the velocity and turbulent characteristics of the boundary layer change and although separation may occur with the formation of a separation bubble, it appears that there is less energy loss associated with the bubble. It is believed that the energy loss may be associated with the bubble growing smaller. This causes a sharp decrease in pressure loss as shown for surfaces of roughness approximately 50 AA to 150 AA in FIG. 9.

Finally, the roughness reaches the critical roughness characteristic at which a decreasing benefit is realized from increasing surface roughness. It is believed that a transition occurs between the laminar boundary layer and the turbulent boundary layer without separation, thus eliminating the separation bubble and its associated energy loss, with the fully turbulent flow not separating from the airfoil as shown in FIG. 11.

Thereafter, the remaining pressure loss is attributable to losses caused by other phenomena which are characteristic of both sides of the airfoil. In this regard, it is estimated that eighty percent of the aerodynamic loss takes place on the suction side surface of the airfoil due in part to separation and twenty percent of the aerodynamic loss takes place on the pressure side surface of the airfoil where the flow does not separate.

Accordingly, airfoils having a surface roughness within twenty percent of the critical roughness characteristic demonstrate satisfactory pressure loss characteristics. Those airfoils having a surface roughness slightly smoother than the critical roughness characteristic experience smaller stress concentrations than airfoils with a slightly greater surface roughness than the critical roughness characteristic, but will have slightly increased pressure losses.

Under operative conditions of an aircraft employing these engines, the maximum benefit in fuel economy is realized from the teaching of this invention by employing airfoils having the critical roughness characteristic at that condition of the engine at which the engine spends its most time, that is, the cruise operative condition.

Although the invention has been shown and described with respect to detailed embodiments thereof, it should be understood by those skilled in the art that various changes in form and detail thereof may be made without departing from the spirit and scope of the claimed invention.

I claim:

1. A flow directing element for the turbine of a rotary machine having an airfoil which includes a leading edge and a trailing edge which extend spanwisely and a convex side surface and a concave side surface which extend chordwisely from the leading edge to the trailing edge, the improvement which comprises:

a convex side surface having a critical roughness characteristic, and a roughened surface having a surface roughness that is greater than 60 AA microinches, that is within twenty percent of the critical roughness characteristic for the airfoil and that is spaced chordwisely from the leading edge and the trailing edge;

wherein the roughened convex side surface decreases aerodynamic flow losses and the spacing of the convex side surface with respect to the leading edge and trailing edge avoids the decrease in fatigue life of the element which is associated with like flow directing elements having increased roughness in the suction side surface and increased roughness in the leading edge and trailing edge region, and wherein the flow directing element has a leading edge region formed by an elliptical surface having a major axis which is generally oriented to extend in the same direction as the convex side surface and the concave side surface and a trailing edge region which is formed by a circular surface and wherein the suction surface has a surface tangent to the trailing edge region on the suction side and wherein the roughened surface of the suction side surface lies between the leading edge region and the trailing edge region and does not extend into these regions of the airfoil to avoid roughness which weakens the leading edge of the airfoil and the trailing edge of the airfoil.

2. A flow directing element for the turbine of a rotary machine having an airfoil which includes leading edge and a trailing edge which extend spanwisely and a convex side surface and a concave side surface which extend chordwisely from the leading edge to the trailing edge, the improvement which comprises:

a convex side surface having a critical roughness characteristic, and a roughened surface having a surface roughness that is greater than 60 AA microinches, that is within twenty percent of the critical roughness for the airfoil and that is spaced chordwisely from the leading edge and the trailing edge;

wherein the roughened convex side surface decreases aerodynamic flow losses and the spacing of the convex side surface with respect to the leading edge and trailing edge avoids the decrease in fatigue life of the element which is associated with like flow directing elements having increased roughness in the suction side surface and increased roughness in the leading edge and trailing edge region;

wherein the flow directions element has a leading edge region formed by an elliptical surface and a trailing edge region which is formed by a circular surface and wherein the suction surface has a surface tangent to the leading edge region on the suction side and tangent to the trailing edge region on the suction side and wherein the roughened surface of the suction side surface lies between the leading edge region and the trailing edge region and does not extend into these regions of the airfoils; wherein the flow directing element has an end having an end wall which adapts the elements to bound a flowpath for working medium gases, and wherein the roughened surface is spaced spanwisely from the end wall.

3. The improved flow directing element of claim 2, wherein the flow directing element includes an outer end wall and an inner end wall which bound the flow path for working medium gases, and wherein the roughened surface is spaced spanwisely from the inner end wall and the outer end wall.

4. The improved flow directing element of claim 3, wherein the flow directing element in the installed condition is disposed about an axis of rotation $A_r$ and has an inner diameter and an outer diameter measured with respect to the axis $A_r$ and wherein the spanwise distance from the roughened surface to each end wall is one-sixth (1/6th) of the outer diameter divided by the inner diameter of the flow directing assembly.

5. The flow directing element of claim 4, wherein the flow directing element is a rotor blade.

6. The flow directing element of claim 4, wherein the flow directing element is a stator vane.

7. The flow directing element of claim 1, wherein the flow directing element is adapted for use in a turbine having a flowpath for working medium gases which extends axially through the airfoils, the airfoil bounding the gases having a Reynolds number characteristic which lies between 80,000 and 200,000 and wherein the surface roughness lies within the range 120 AA microinches to 200 AA microinches.

8. A method of operating a gas turbine engine installed in an aircraft, the aircraft having a sea level take off operative condition and a cruise operative condition, the gas turbine engine having a turbine and an array of airfoils disposed therein, each airfoil having a suction side surface and a pressure side surface, comprising:

flowing working medium gases through the array of airfoils at a first Reynolds number at a sea level take off operative condition and flowing working medium gases at a second Reynolds number which is less than the first Reynolds number at the cruise operative condition of the aircraft;

flowing the working medium gases over the suction side surface and pressure side surface of the airfoil, the suction side surface of the airfoil being roughened such that the surface roughness is within twenty percent of the critical roughness characteristic of the airfoil for the cruise operative condition;

wherein the roughened suction side surface increases aerodynamic flow losses at the cruise operative condition and wherein the spacing of the roughened suction side surface and roughness of the suction side surface with respect to the leading edge and the trailing edge avoids the decrease in fatigue life of the flow directing element which is associated with like flow directing elements having increased roughness over the suction side surface at the leading edge and trailing edge of the airfoil.

9. The method of operating a gas turbine engine in an aircraft as set forth in claim 8, wherein the Reynolds number of the working medium gases is in a range of 80,000 to 200,000 and wherein the surface roughness lies in a range of 120 AA microinches to 200 AA microinches.

10. The method of operating a gas turbine engine in an aircraft as set forth in claim 9, wherein the surface roughness lies in a range of 150 AA to 180 AA microinches.

* * * * *